US012572621B2

(12) United States Patent
Nakata

(10) Patent No.: US 12,572,621 B2
(45) Date of Patent: Mar. 10, 2026

(54) DATA ANALYZING APPARATUS, METHOD AND STORAGE MEDIUM

(71) Applicant: KABUSHIKI KAISHA TOSHIBA, Tokyo (JP)

(72) Inventor: Kouta Nakata, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1200 days.

(21) Appl. No.: 17/461,659

(22) Filed: Aug. 30, 2021

(65) Prior Publication Data

US 2022/0292299 A1     Sep. 15, 2022

(30) Foreign Application Priority Data

Mar. 9, 2021    (JP) ................................. 2021-037068

(51) Int. Cl.
| | |
|---|---|
| *G06F 18/2133* | (2023.01) |
| *G06F 18/21* | (2023.01) |
| *G06F 18/2132* | (2023.01) |
| *G06F 18/23* | (2023.01) |

(52) U.S. Cl.
CPC .... *G06F 18/2133* (2023.01); *G06F 18/21322* (2023.01); *G06F 18/217* (2023.01); *G06F 18/23* (2023.01)

(58) Field of Classification Search
CPC ........... G06F 18/2133; G06F 18/21322; G06F 18/217; G06F 18/23; G06T 2207/30148; G06T 7/0004
See application file for complete search history.

(56) References Cited

U.S. PATENT DOCUMENTS

| | | | |
|---|---|---|---|
| 9,970,983 | B2 | 5/2018 | Schachtner et al. |
| 10,817,719 | B2 | 10/2020 | Komatsu et al. |
| 2012/0041906 | A1* | 2/2012 | Huh .................. G06V 10/7715 |
| | | | 708/207 |
| 2018/0060448 | A1* | 3/2018 | Miyamoto .............. G06F 16/00 |

FOREIGN PATENT DOCUMENTS

| | | |
|---|---|---|
| JP | 2015049406 A | 3/2015 |
| JP | 2020012976 A | 1/2020 |
| WO | 2017217412 A1 | 12/2017 |

OTHER PUBLICATIONS

Lee, et al., "Learning the parts of objects by non-negative matrix factorization", Nature, vol. 401, pp. 788-791, Published Oct. 21, 1999.

Tanaka, et al., "Robust Estimation of Mixed-Type Wafer Map Similarity Utilizing Non-negative Matrix Factorization", AEC/APC Symposium Asia 2019.

Japanese Decision to Grant a Patent (and its English translation thereof) dated Jun. 18, 2024, issued in counterpart Japanese Application No. 2021-037068.

* cited by examiner

*Primary Examiner* — Jack Chiang

(74) *Attorney, Agent, or Firm* — Holtz, Holtz & Volek PC

(57) ABSTRACT

According to one embodiment, a data analyzing apparatus acquires data containing the number N of analysis target samples (where N is an integer larger than or equal to 2). The apparatus performs a matrix factorization upon the data to factorize the data into the number K of basis samples and the number K of weights corresponding to the number K of basis samples (where K is an integer larger than or equal to 2), and fixes part of the K basis samples to specific basis samples in the matrix factorization.

14 Claims, 10 Drawing Sheets

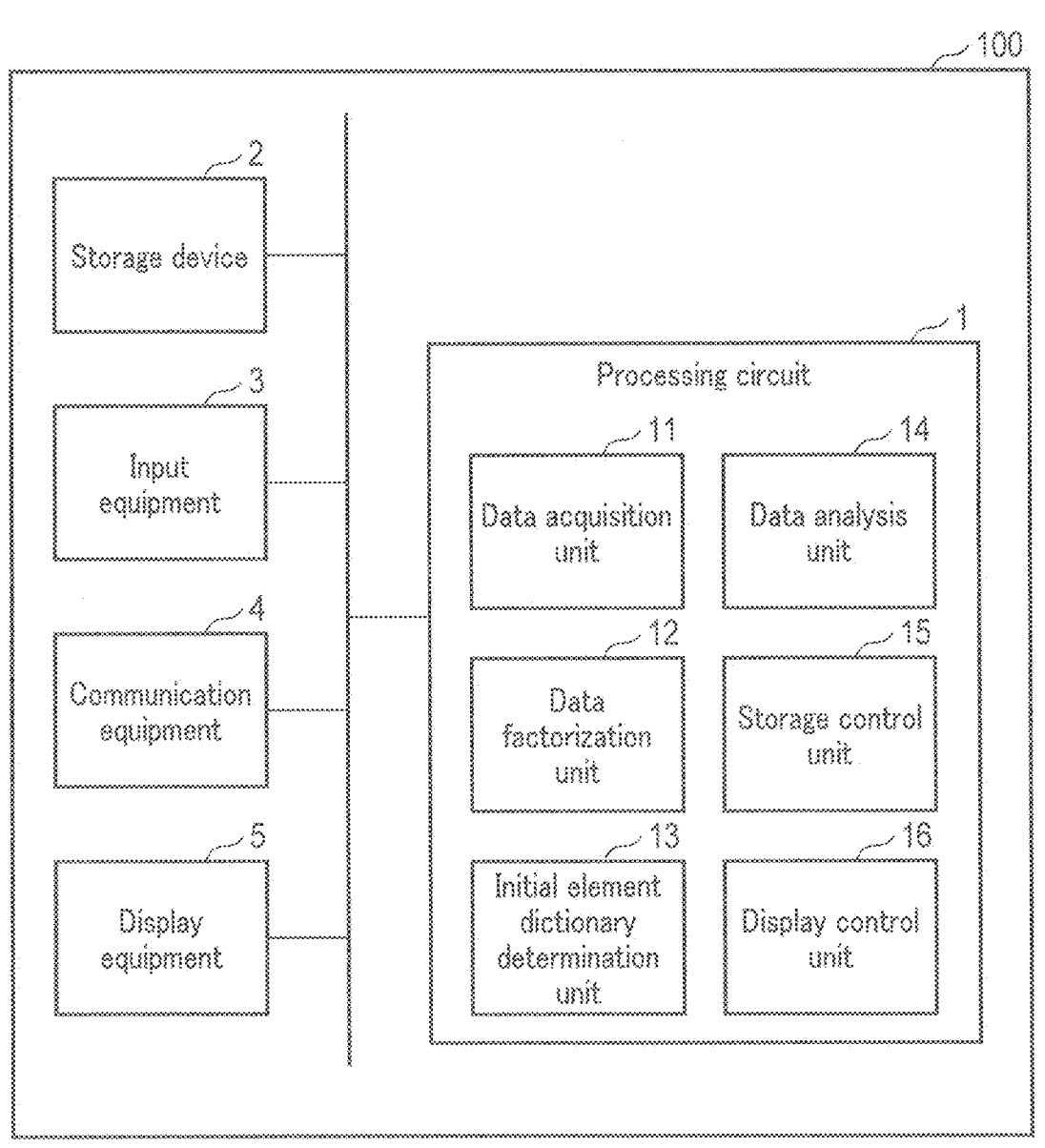
F I G. 1

N

D

X

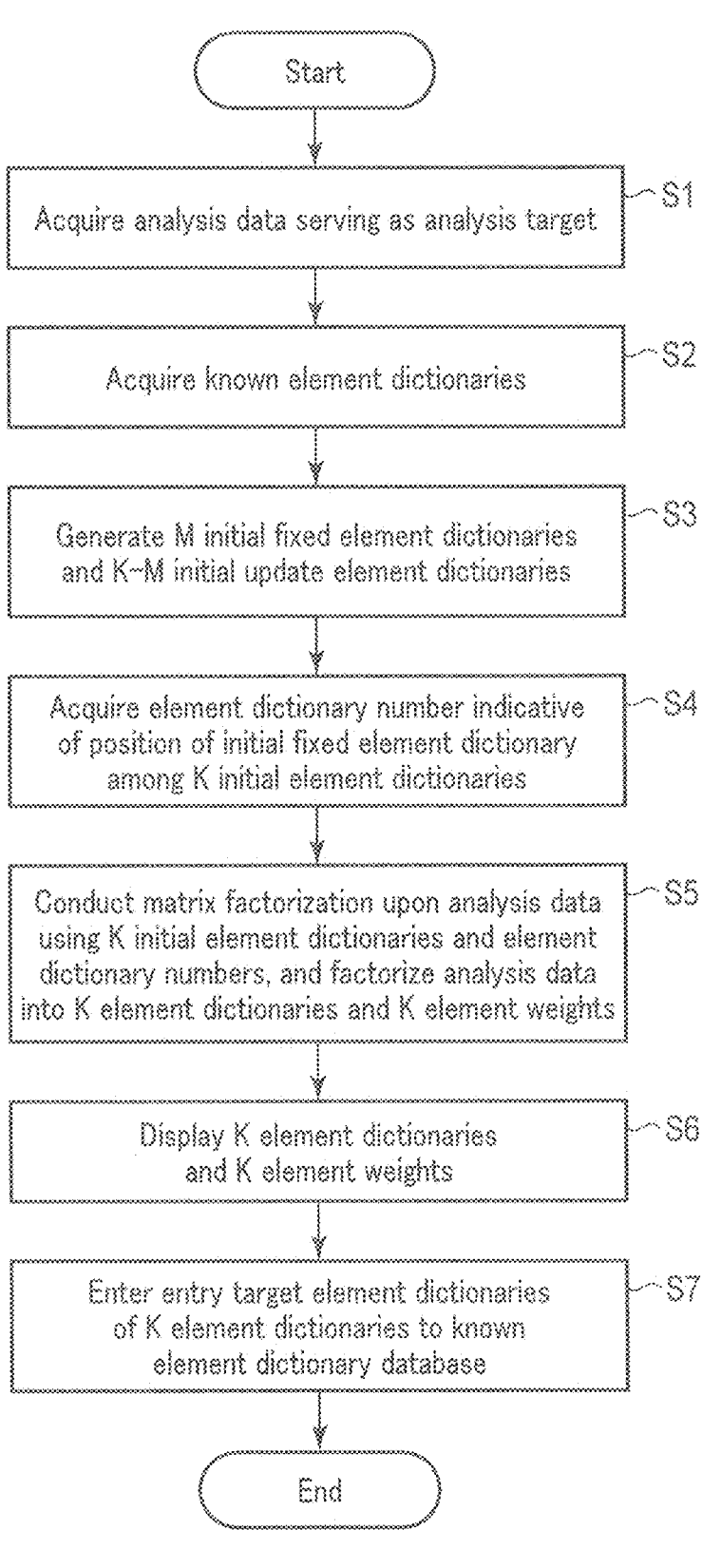

Start

Acquire analysis data serving as analysis target — S1

Acquire known element dictionaries — S2

Generate M initial fixed element dictionaries and K~M initial update element dictionaries — S3

Acquire element dictionary number indicative of position of initial fixed element dictionary among K initial element dictionaries — S4

Conduct matrix factorization upon analysis data using K initial element dictionaries and element dictionary numbers, and factorize analysis data into K element dictionaries and K element weights — S5

Display K element dictionaries and K element weights — S6

Enter entry target element dictionaries of K element dictionaries to known element dictionary database — S7

End

F I G. 4

8
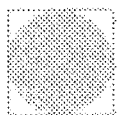
7
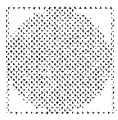
6
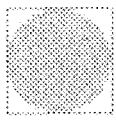
5
Element dictionary number
F I G. 7
4
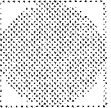
3
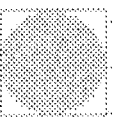
2
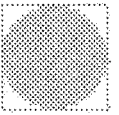
1

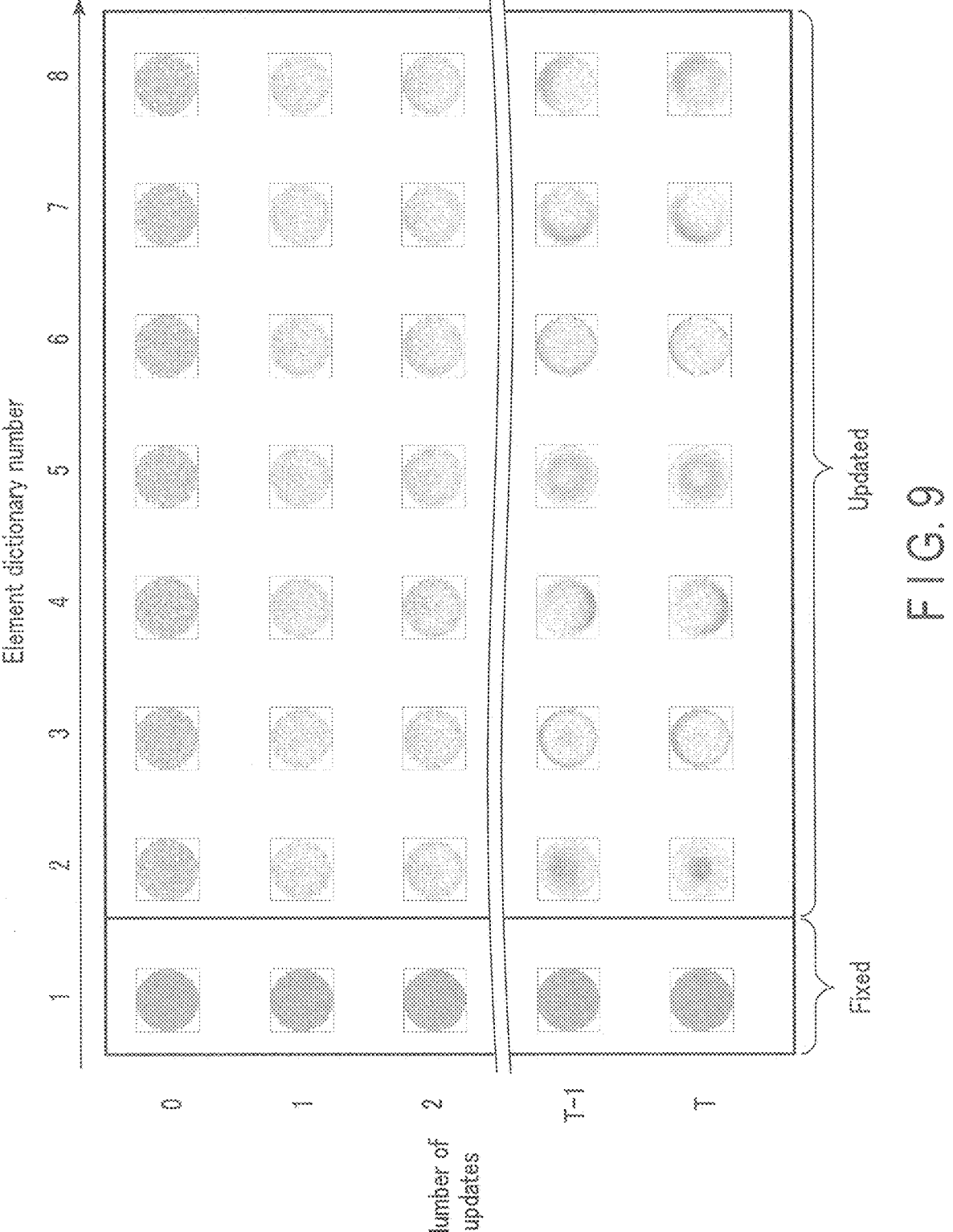
F I G. 9

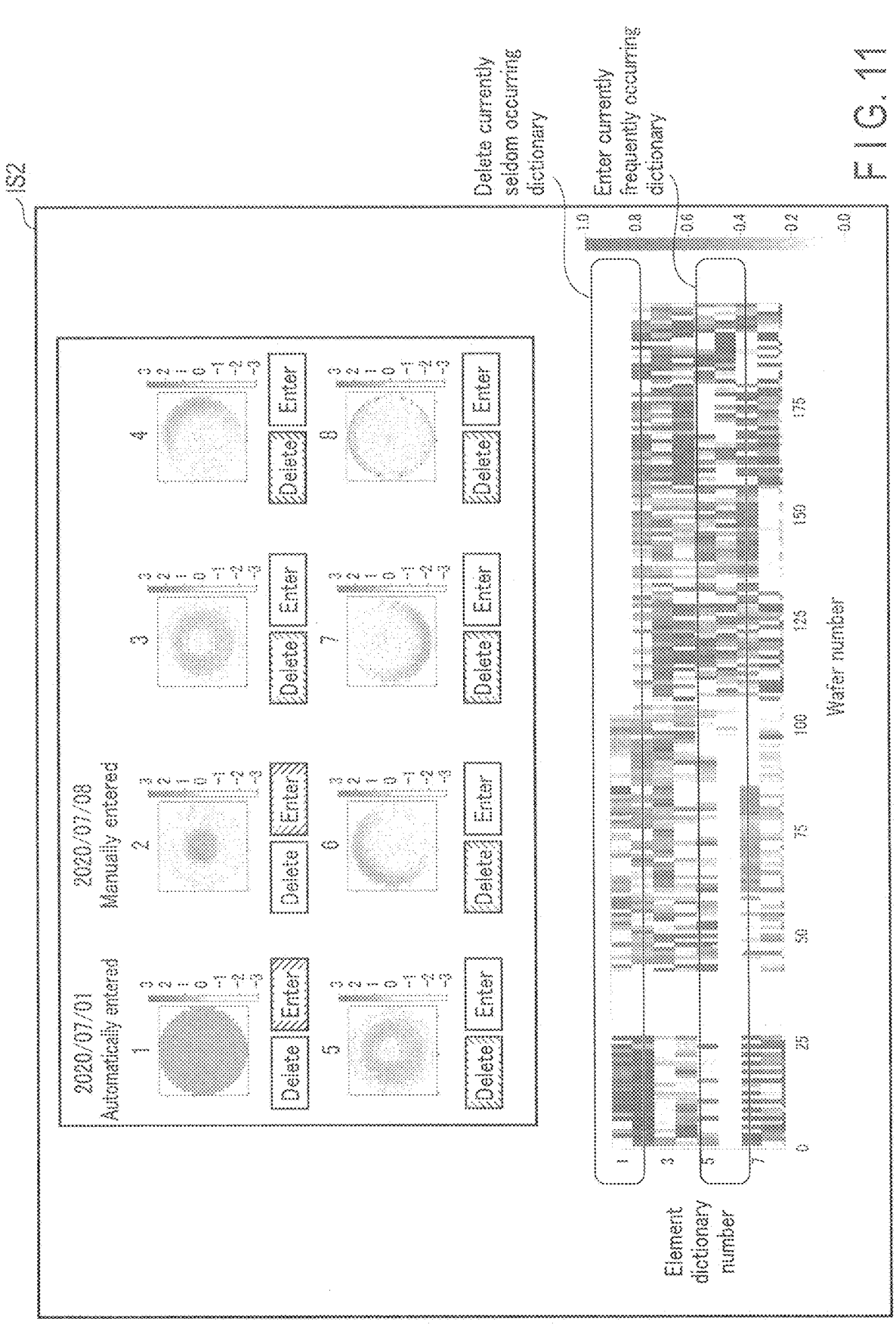
F I G. 11

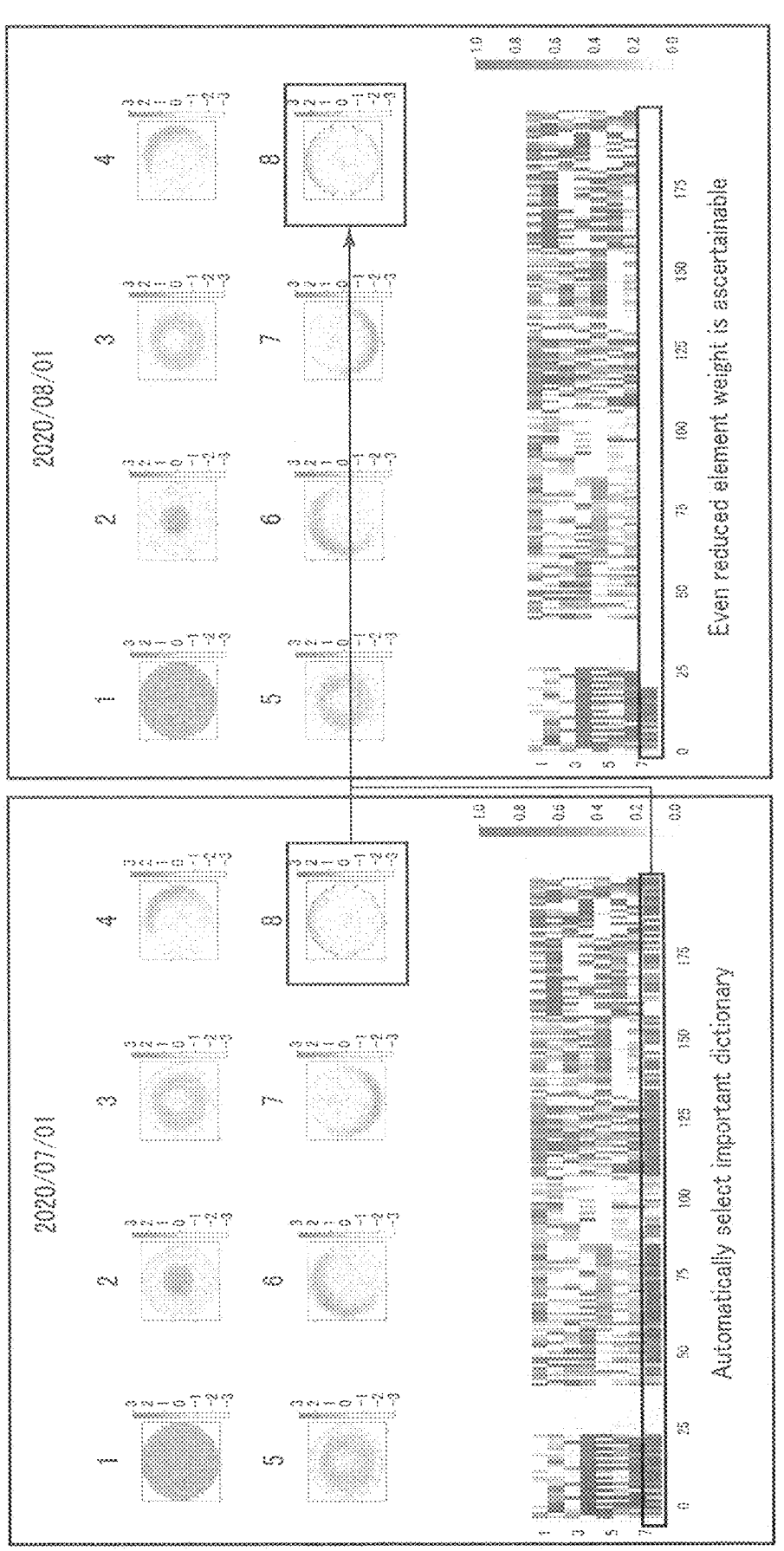
F I G. 12

DATA ANALYZING APPARATUS, METHOD AND STORAGE MEDIUM

CROSS-REFERENCE TO RELATED APPLICATIONS

This application is based upon and claims the benefit of priority from Japanese Patent Application No. 2021-037068, filed Mar. 9, 2021, the entire contents of which are incorporated herein by reference.

FIELD

Embodiments described herein relate generally to a data analyzing apparatus, method and storage medium.

BACKGROUND

A data analysis can be performed by factorizing data containing a large quantity of samples into a small number of element dictionaries and element weights of the element dictionaries. At a semiconductor factory, for instance, wafer inspection data is factorized into element dictionaries and element weights so that patterns of defective chips on wafers can be analyzed in accordance with the element dictionaries, and the state of occurrence of a defective chip pattern on each wafer can be analyzed in accordance with the element weights.

Non-negative matrix factorization (NMF) has been suggested as a technique for factorizing data into element dictionaries and element weights. Through NMF, element dictionaries are generated as basis samples, and element weights are generated as weights for these basis samples.

When the value of the data changes, the element dictionary and element weights obtained by data factorization change. Therefore, even if the element dictionary and element weights are obtained for each data, it is not possible to analyze the known element dictionary of interest over a long period of time. In the example of wafer inspection data from a semiconductor factory, the element dictionary differs greatly for data from different periods of time because the pattern of defect appearance differs depending on the state of the manufacturing process in the factory. In the analysis of product defects, the fact that the pattern of defective chips of interest no longer appears due to the improvement of the manufacturing process is also important information. Therefore, the results of factorization cannot be analyzed as required because the results of the factorization vary greatly between data from different periods.

BRIEF DESCRIPTION OF THE DRAWINGS

FIG. 1 is a diagram for showing an exemplary configuration of a data analyzing apparatus according to the present embodiment.

FIG. 4 is a diagram for showing a typical flow of a data analyzing process implemented by a processing circuit of the data analyzing apparatus of FIG. 1.

FIG. 7 is a diagram for showing an exemplary element map of K (K=8) initial element dictionaries.

FIG. 9 is a diagram for schematically showing update algorithms of element dictionaries.

FIG. 11 is a diagram for showing an exemplary GUI screen for selecting element dictionaries to be entered.

FIG. 12 is a diagram for explaining the first operation example of the data analyzing process according to the present embodiment.

DETAILED DESCRIPTION

Figure 2:
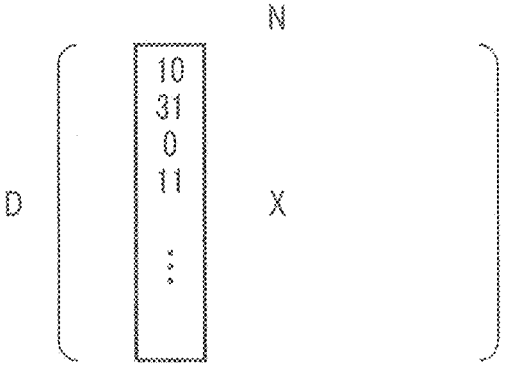
FIG. 2 is a diagram for showing an exemplary matrix expression of analysis data.

In general, according to one embodiment, a data analyzing apparatus includes a processing circuit. The processing circuit acquires data containing the number N of analysis target samples (where N is an integer larger than or equal to 2). The processing circuit performs a matrix factorization upon the data to factorize the data into the number K of basis samples and the number K of weights for these basis samples (where K is an integer larger than or equal to 2), and fixes part of the K basis samples to specific basis samples in the matrix factorization.

The data analyzing apparatus, method, and storage medium according to the present embodiment will be explained below with reference to the drawings.

FIG. 1 is a diagram showing an exemplary configuration of a data analyzing apparatus 100 according to the present embodiment. The data analyzing apparatus 100 is a computer that includes a processing circuit 1, a storage device 2, input equipment 3, communication equipment 4, and display equipment 5, as illustrated in FIG. 1.

The processing circuit 1 includes a processor such as a central processing unit (CPU) and a memory such as a random access memory (RAM). The processing circuit 1 is configured to analyze process target data. The processing circuit 1 executes a program to implement a data acquisition unit 11, a data factorization unit 12, an initial element dictionary determination unit 13, a data analysis unit 14, a storage control unit 15, and a display control unit 16. This program is stored in a processor-readable non-transitory storage medium. The program may be stored in a built-in storage medium such as the storage device 2, or in a portable storage medium. The hardware implementation of the processing circuit 1 is not limited to the above. For instance, the hardware may be configured by a circuit such as an application specific integrated circuit (ASIC) that realizes the data acquisition unit 11, data factorization unit 12, initial element dictionary determination unit 13, data analysis unit 14, storage control unit 15, and/or display control unit 16. The data acquisition unit 11, data factorization unit 12, initial element dictionary determination unit 13, data analysis unit 14, storage control unit 15, and display control unit 16 may be implemented either in a single integrated circuit or separately in multiple integrated circuits.

The data acquisition unit 11 acquires data to be analyzed (hereinafter referred to as "analysis data"). The analysis data relates to the number N of samples (where N is an integer larger than or equal to 2). Examples of the samples according to the present embodiment include semiconductor inspection data. The semiconductor inspection data indicates defects and flaws in chips arranged on a semiconductor wafer. The analysis data can be described in matrices.

FIG. 2 is a diagram for showing an exemplary matrix expression of analysis data. As illustrated in FIG. 2, the analysis data may be expressed in a matrix of D rows by N columns, where N represents the number of samples in the analysis data, and D represents the number of dimensions of the analysis data. It is assumed that the sample values of the analysis data are non-negative.

The analysis data according to the present embodiment will be explained in detail below with the case of the samples being semiconductor inspection data items serving as the example. The inspection of a semiconductor wafer is conducted multiple times upon multiple chips on the wafer. Through the inspection of the semiconductor wafer, information relating to the number of defects or flaws in each chip can be obtained as semiconductor inspection data. When the samples are semiconductor inspection data items, a sample number N indicates the number of wafers, and a dimension number D indicates the number of chips on a wafer in FIG. 2. A sample value X shows information that relates to the number of defects or flaws in a chip as a result of the inspection. In particular, the sample value X indicates the number of defects or flaws in each chip, or the ratio of the number of defects or flaws to the total number of chips. Hereinafter, the sample value X will be regarded simply as the number of defects. The sample values X are non-negative.

Figure 3:
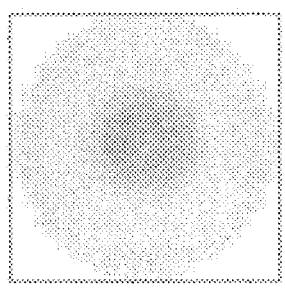
FIG. 3 is a diagram for showing an exemplary heat map (element map) of semiconductor inspection data.

FIG. 3 shows an exemplary heat map of semiconductor inspection data. A heat map image representing the number of defects in chips in the semiconductor inspection data will be referred to as a "defect map". The defect map illustrates the number of defects in each chip of a semiconductor wafer in different shades or colors, as in FIG. 3. The defect map visualizes a column of the analysis data of FIG. 2 in accordance with the positions of the chips on the wafer. The map may illustrate chips with a higher number of defects in darker tones of red, and chips with a lower number of defects in lighter tones of color. In FIG. 3, the chips around the center area have more defects than those in other areas. The distribution of defective chips on a defect map has been known to have a specific pattern that corresponds to the cause of defects. Through the observation of a defect map, the patterns of defects that appear in the chips of the semiconductor wafer can be ascertained, and the cause of these defects can be investigated and analyzed.

The data factorization unit 12 performs a matrix factorization upon the analysis data to factorize the data into the number K of basis samples and the number K of weights for the K basis samples (where K is an integer larger than or equal to 2). In the matrix factorization, the data factorization unit 12 fixes part of the K basis samples to specific basis samples. The K basis samples represent the number K of typical features in the number N of samples in the analysis data. Each of the basis samples indicates a typical feature expressed in the form of a D-dimensional vector. The basis samples correspond to bases in the matrix factorization. A weight indicates a degree of contribution of a basis sample to each of the N samples. The K weights represent weights of the K basis samples to the N samples.

In particular, in the matrix factorization, the data factorization unit 12 iterates update algorithms upon the K initial basis samples and the K initial weights until the stop condition are satisfied. The K initial basis samples include the number M of first initial basis samples (where M is an integer larger than or equal to 1) as specific basis samples in the matrix factorization, and the number K–M of second initial basis samples to be updated in the matrix factorization. While keeping the M first initial basis samples fixed, the data factorization unit 12 updates the K–M second initial basis samples and the K weights until the stop condition are satisfied so that the analysis data can be factorized into K basis samples and K weights. A set of basis samples is referred to as a "dictionary", the basis samples are referred to as "element dictionaries", and the initial basis samples are referred to as "initial element dictionaries". A weight is referred to as an "element weight", and an initial weight is referred to as an "initial element weight". Furthermore, a value of a matrix element of an element weight is referred to as an "element weight value".

The initial element dictionary determination unit 13 generates M first initial basis samples (initial element dictionaries) to be fixed as specific basis samples in the matrix factorization, and K–M second initial basis samples (initial element dictionaries) to be updated in the matrix factorization. The initial element dictionary determination unit 13 may select M first initial basis samples from the known basis samples, or may generate M first initial basis samples based on the known basis samples. The known basis samples may be basis samples (element dictionaries) generated in past inspections by the data factorization unit 12 or the like and stored in the storage device 2 or the like. The known basis samples are referred to as "known element dictionaries". The initial element dictionary determination unit 13 may generate K–M second initial basis samples with any desired method. The first initial basis samples are referred to as "initial fixed element dictionaries", and the second initial basis samples are referred to as "initial update element dictionaries". Furthermore, among the element dictionaries generated in the matrix factorization, the element dictionaries based on the initial fixed element dictionaries are referred to as "fixed element dictionaries", and the element dictionaries based on the initial update element dictionaries are referred to as "update element dictionaries".

Using K basis samples (element dictionaries) and K weights (element weights) generated by the data factorization unit 12, the data analysis unit 14 analyzes the analysis data. Each of the K element weights represents a weight that each of the K element dictionaries has on each of the N semiconductor wafers. The data analysis unit 14 may analyze the occurrence patterns of defective chips over N semiconductor wafers based on the element dictionaries, and the frequencies of the occurrence patterns of defective chips in each of the N semiconductor wafers based on the element weights.

The storage control unit 15 stores various kinds of information in the storage device 2. The storage control unit 15 may select, from the K basis samples (element dictionaries) and/or K weights (element weights) generated by the data factorization unit 12, storage-targeted basis samples and/or weights in accordance with an operator's command, and store them in the storage device 2.

The display control unit 16 displays various types of information via the display equipment 5. For instance, the display control unit 16 displays the K basis samples (element dictionaries) and/or K weights (element weights) generated by the data factorization unit 12 via the display equipment 5.

The storage device 2 may be constituted by a read-only memory (ROM), a hard disk drive (HDD), a solid state drive (SSD), an integrated circuit storage device, and the like. The storage device 2 stores various calculation results obtained by the processing circuit 1 and programs executed by the processing circuit 1, and the like.

The input equipment 3 inputs various commands from the operator. For the input equipment 3, a keyboard, a mouse, various switches, a touch pad, or a touch panel display may be used. The output signal from the input equipment 3 is supplied to the processing circuit 1. The input equipment 3 may be a computer connected to the processing circuit 1 in a wired or wireless manner.

The communication equipment 4 is an interface for communicating information with external devices connected to the data analyzing apparatus 100 via a network.

The display equipment 5 displays various types of information. For instance, under the control of the display control unit 16, the display equipment 5 displays the K basis samples (element dictionaries) and/or K weights (element weights) generated by the data factorization unit 12. As the display equipment 5, a cathode-ray tube (CRT) display, a liquid crystal display, an organic electro luminescence (EL) display, a light-emitting diode (LED) display, a plasma display or any other display known in this technical field can be suitably adopted.

The data analyzing apparatus 100 according to the present embodiment will be described in detail below.

FIG. 4 shows a typical flow of the data analyzing process implemented by the processing circuit 1 of the data analyzing apparatus 100. As illustrated in FIG. 4, the data acquisition unit 11 acquires analysis data to be analyzed (step S1). At step S1, the data acquisition unit 11 acquires the analysis data including the number N of samples relating to the currently conducted inspection, for example from a computer in a semiconductor factory by way of the communication equipment 4. If the analysis data relating to the current inspection is stored in the storage device 2, the data acquisition unit 11 may acquire the analysis data of the current inspection from the storage device 2.

After step S1, the initial element dictionary determination unit 13 acquires known element dictionaries (step S2). For instance, a known element dictionary, which is an element dictionary previously generated by the data factorization unit 12, is entered into a known element dictionary database and stored in the storage device 2. The known element dictionary database is a file managed by the storage device 2 in a manner that known element dictionaries are searchable. A known element dictionary is described in a matrix expression, in the same manner as the aforementioned element dictionaries (basis samples).

Figure 5:
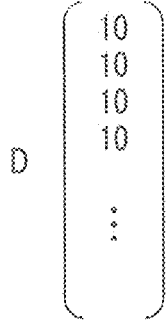
FIG. 5 is a diagram for showing an exemplary known element dictionary expressed in a matrix.
Figure 6:
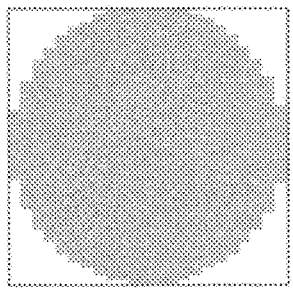
FIG. 6 is a diagram for showing a heat map (element map) of the known element dictionary of FIG. 5.

FIG. 5 shows an exemplary known element dictionary expressed in a matrix. FIG. 6 shows a heat map (element map) of the known element dictionary in FIG. 5. As illustrated in FIG. 5, the known element dictionary includes data in the same format as each sample contained in the analysis data, with the number of columns being 1 and the number of rows being the dimension number D. In the known element dictionary of FIG. 5, a constant number of defects (sample value), which is 10, is assigned to all the chips on the semiconductor wafer. The known element dictionary of FIG. 5 is displayed with all the chips rendered in a certain color such as red, as illustrated in FIG. 6.

In general, a known element dictionary is used for generation of an initial fixed element dictionary. The initial element dictionary determination unit 13 therefore acquires, at step S2, a known element dictionary to be used as an initial fixed element dictionary. As the known element dictionary, an element dictionary designated by the operator via the input equipment 3 from among the element dictionaries stored in the storage device 2 may be used, or an automatically selected element dictionary may be used. The known element dictionary is not limited to a dictionary with the same number of detects, and may be a dictionary with a certain pattern of defects. The number of known element dictionaries to be acquired may be one or more.

After step S2, the initial element dictionary determination unit 13 generates M initial fixed element dictionaries and K−M initial update element dictionaries (step S3). At step S3, the initial element dictionary determination unit 13 determines the known element dictionary acquired at step S2 as an initial fixed element dictionary. Alternatively, the initial element dictionary determination unit 13 may generate an initial fixed element dictionary based on the statistical values of the known element dictionary acquired at step S2. As a statistical value, the average value or the maximum, minimum, or intermediate value of the known element dictionaries, or a value based on the probability distribution of the known element dictionaries may be adopted. The number M of initial fixed element dictionaries is determined to be one or larger, and smaller than K. The number M may be determined by the operator, by way of the input equipment 3, to take any value within this range.

The initial update element dictionary may be generated with any suitable method. For instance, the initial element dictionary determination unit 13 may set the number of defects of each chip to a random value for the generation of the initial update element dictionary. The numbers of defects may in a chip be set to the same value or different values among the chips of the K−M initial update element dictionaries. The initial element dictionary determination unit 13 may calculate an initial update element dictionary based on the statistical value of the known element dictionary acquired at step S2. As a statistical value, the average value or the maximum, minimum, or intermediate value of the known element dictionaries may be adopted, or even a value based on the probability distribution of the known element dictionaries. For instance, when two or more known element dictionaries having similar defect patterns are acquired at step S2, an initial update element dictionary having the average value of these known element dictionaries may be calculated. A defect pattern according to the present embodiment denotes a spatial distribution of defect numbers in an element dictionary.

After step S3, the data factorization unit 12 acquires an element dictionary number (index) Ks that indicates the position of the initial fixed element dictionary in the K initial element dictionaries (step S4). For instance, a smaller number is assigned to the initial fixed element dictionary than to the initial update element dictionaries. According to the present embodiment, it is assumed that the number M is 1, and the number K is 8. That is, one initial fixed element dictionary and seven initial update element dictionaries are generated. The element dictionary number Ks of the initial fixed element dictionary can be expressed as Ks=[1].

FIG. 7 shows an exemplary element map for the number K (K=8) of initial element dictionaries. As illustrated in FIG. 7, the initial element dictionary of the number Ks=[1] is an initial fixed element dictionary, whereas the initial element dictionaries of the numbers Ks=[2] to [8] are initial update element dictionaries. The initial fixed element dictionaries have a uniform defect pattern, and the initial update element dictionaries have random defect patterns. The initial update element dictionaries of the numbers Ks=[2] to [8] may have the same defect patterns, or different defect patterns.

After step the data factorization unit 12 conducts a matrix factorization upon the analysis data using K initial element dictionaries and element dictionary numbers to factorize the analysis data into K element dictionaries and K element weights (step S5). At step S5, in order to factorize the analysis data into K element dictionaries and K element weights, the data factorization unit 12 fixes the M initial fixed element dictionaries and updates the K−M initial update element dictionaries and K element weights until the stop condition are satisfied.

In particular, the data factorization unit 12 conducts a matrix factorization including an update algorithm to factorize the analysis data into K basis samples and K element weights. This update algorithm is iterated until the loss function that evaluates an error between the analysis data and the product of an element dictionary and an element weight satisfies the stop condition. For matrix factorization, non-negative matrix factorization is adopted. The update algorithm for the NMF may be expressed as shown below in (1). Under the limiting conditions of the element dictionary B and element weight H taking non-negative values, the element dictionary B and element weight H are iteratively updated such that, as shown in expression (1), the loss function Loss for evaluating the error between the analysis data X and the product of the element dictionary B and element weight H can be minimized.

$$\min_{B,H} \mathrm{Loss}(X \| BH) \tag{1}$$

$$\text{s.t } B, H \geq 0, \sum_i b_{ij} = 1 \forall\, j$$

The stop condition for the update algorithm can be freely set. For instance, the stop condition for the update algorithm may be such that the update algorithm is iterated for a predetermined number of times, the loss function has been reduced to a value smaller than a predetermined value, or the degree of update of the element dictionaries and element weights has been reduced to a value smaller than a predetermined value. Here, it is assumed that the stop condition for the update algorithm are determined such that the update algorithm is iterated for a predetermined number of times.

Figure 8:
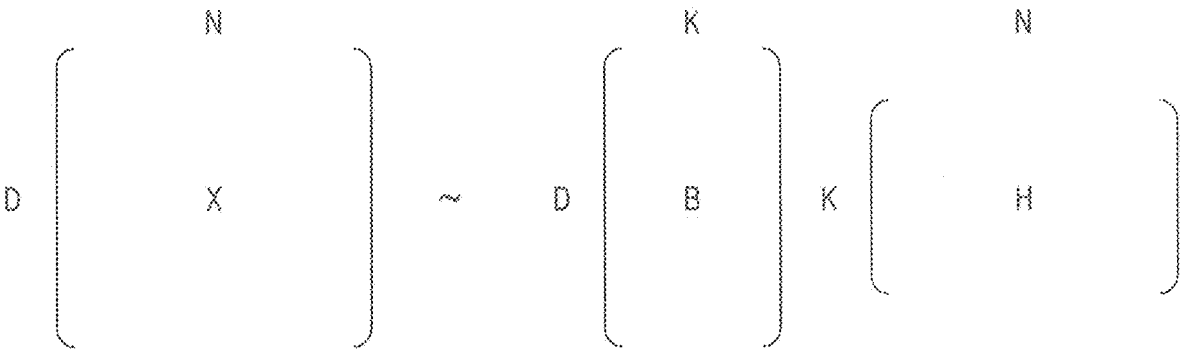
FIG. 8 is a diagram for showing a matrix expression of the NMF.

FIG. 8 shows a matrix expression of the NMF. The NMF is performed upon the D-row×N-column analysis data X as indicated in FIG. 8, as a result of which the analysis data X is factorized into a D-row×K-column element dictionary B and a K-row×N-column element weight H, where K is determined to be smaller than N and D. In other words, the NMF is also used for dimensional compression. The sample value of the analysis data X, the sample value of the element dictionary B, and the element weight value of the element weight H take non-negative values.

The non-negative matrix factorization according to the present embodiment will be described in detail. In the NMF according to the present embodiment, the algorithm for updating the element dictionary B shown in equations (2) to (4) and the algorithm for updating the element weight H shown in equations (5) to (6) are iterated. In the equations (2) to (6), the subscript d represents the number of a chip in a semiconductor wafer, the subscript K represents an element dictionary number, and the subscript n represents the number of the semiconductor wafer.

$$dB_{d,k} = \frac{\sum_{N} X_{d,n}H_{k,n}}{\sum_{N}(B_{d,k}H_{k,n})H_{k,n}} \tag{2}$$

$$dB_{d,k} = \begin{bmatrix} 1 \\ 1 \\ \cdots \\ 1 \end{bmatrix}_{k=k_s} \tag{3}$$

-continued $$B_{d,k} = B_{d,k} \cdot dB_{d,k} \tag{4}$$

$$dH_{k,n} = \frac{\sum_{N} X_{d,n}B_{d,k}}{\sum_{N}(B_{d,k}H_{k,n})B_{d,k}} \tag{5}$$

$$H_{k,n} = H_{k,n} \cdot dH_{k,n} \tag{6}$$

The degree of update dB of the element dictionaries is found using the current element weight H as expressed in Equation (2), and the element dictionary B is updated based on the current element dictionary B and degree of update dB as expressed in Equation (4). Furthermore, the degree of update dH of the element weight is calculated using the updated element dictionary B as expressed in Equation (5), and the element weight H is updated based on the current element weight H and the update amount dH as expressed in Equation (6). For the first calculation, the initial update element dictionary is used as the initial value of the element dictionary B, and the initial element weight is used as the initial value of H. The initial element weight is a K-row× N-column matrix having random values.

When updating the element dictionaries, the values in the column corresponding to the element dictionary number Ks of the fixed element dictionary in the degree of update dB of the element dictionaries are all changed to 1, as expressed in Equation (3). With the degree of update dB of the fixed element dictionary being 1, the fixed element dictionary will not be updated. The values in the column corresponding to the element dictionary number of the update element dictionary are updated in accordance with Equations (2) and (4) as mentioned earlier.

The update algorithm of Equations (2) to (4) for the element dictionary B and the update algorithm of Equations (5) to (6) for the element weight H are each iterated for T times. In this manner, only the update element dictionaries are updated, while no updates are made to the fixed element dictionary, and the analysis data X can thereby be factorized into the element dictionaries B and element weight H having non-negative values. The number T, which is the stop condition, can be freely determined.

FIG. 9 schematically shows the update algorithm of the element dictionaries, where changes in the element maps corresponding to the element dictionaries of the element dictionary numbers, Ks [1] to [8], are illustrated as the updating process proceeds for the number of update times T. As shown in FIG. 9, the element dictionary of the element dictionary number Ks=[1] is set to a fixed element dictionary, and the element dictionaries of the element dictionary numbers Ks=[2] to [8] are set to update element dictionaries. In the initial update (number of update times=0), the element dictionary of the element dictionary number Ks=[1] is set to an initial fixed element dictionary, and the element dictionaries of the element dictionary numbers Ks=[2] to [8] are set to initial update element dictionaries. With the update algorithm iterated in accordance with Equations (2) to (6), the element dictionaries of the element dictionary number Ks= [2] to [8] can be updated without updates being made to the element dictionary of element dictionary number Ks=[1].

After step S5, the display control unit 16 displays the K element dictionaries and K element weights generated at step S5 (step S6). The display control unit 16 displays on the display equipment 5 a display screen in which K element dictionaries and K element weights are arranged in a specific layout at step S6.

Figure 10:
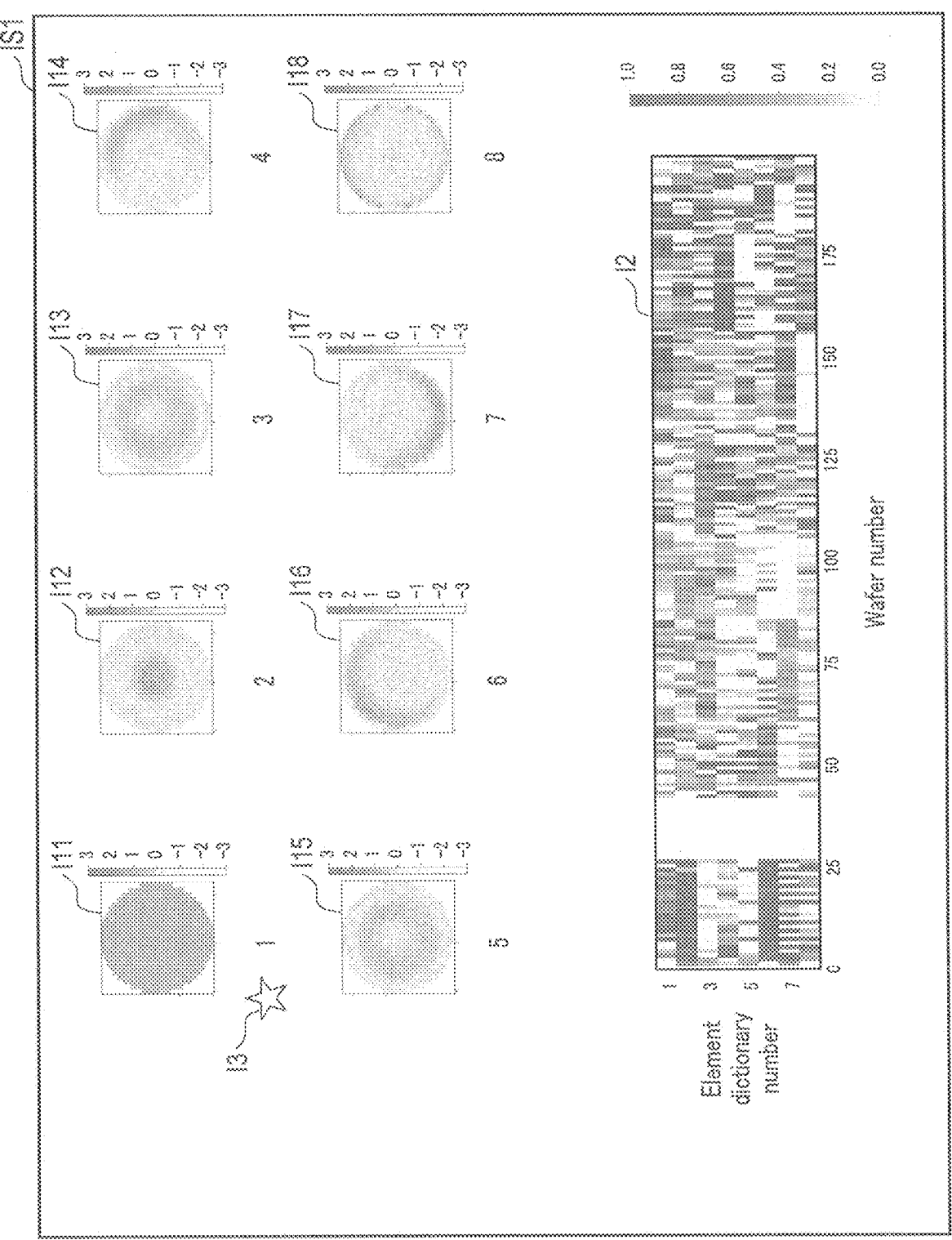
FIG. 10 is a diagram for showing an exemplary screen displaying K (K=8) element dictionaries and K element weights.

FIG. 10 shows an example of a display screen IS1 having K (K=8) element dictionaries and K element weights. Element maps I11 to I18 are displayed respectively for the element dictionaries of element dictionary numbers Ks=[1] to [8] as shown in FIG. 10. Preferably, a color bar may be displayed next to each of the element maps I11 to I18. The color bar indicates the relationship between the number of defects in the element dictionary (sample value) and color value. With the element maps I11 to I18 displayed, the defect pattern of each element dictionary can be visually checked. Since the element dictionary of the number Ks=[1] is a fixed element dictionary that is not updated, the element map I11 corresponding to a fixed element dictionary may be marked with a symbol I3 indicating a fixed element dictionary, as shown in FIG. 10. The element maps I12 to I18 corresponding to the update element dictionaries may be marked with a symbol indicating an update element dictionary.

As illustrated in FIG. 10, the display screen IS1 includes an element weight map I2 relating to the K element weights. The element weight map I2 expresses the K element weights in colors or shades on a two-dimensional plane having the element dictionary number as the first axis and the wafer number (sample identifier) as the second axis. In FIG. 10, the vertical axis is defined by the element dictionary number, and the horizontal axis is defined by the wafer number. Preferably, a color bar indicating the relationship between the element weight value and the color value may be displayed in parallel to the element weight map I2. By focusing on a row (element dictionary) on the element weight map I2, the degree of contribution of the element dictionary corresponding to this row to each semiconductor wafer can be ascertained from color or shade. By focusing on a column on the element weight map I2, the degree of contribution of the semiconductor wafer corresponding to this column to each element dictionary can be ascertained in color or shade.

The display mode of the element dictionaries and element weights is not limited to the above. For instance, either element dictionaries or element weights alone may be displayed. Furthermore, rather than all element dictionaries and/or element weights generated at step S5, only designated ones may be displayed.

After step S6, the storage control unit 15 enters entry target element dictionaries of the K element dictionaries to the known element dictionary database (step S7). After entry to the known element dictionary database, the entry target element dictionaries are stored in the storage device 2. The entry target element dictionaries may be designated by an operator through the input equipment 3, or automatically determined in accordance with some standards. Element dictionaries entered in the known element dictionary database can then be used for generating a fixed element dictionary in the subsequent data analysis.

If an entry target element dictionary is to be selected through the operator's designation, the display control unit 16 displays a GUI screen for selecting an entry target element dictionary on the display equipment 5.

FIG. 11 shows an example of a GUI screen IS2 for selecting an entry target element dictionary. On the GUI screen IS2 are displayed K element maps corresponding to the K element dictionaries (K=8) and an element weight map relating to the K element weights, as illustrated in FIG. 11. The K element maps correspond to the K element dictionaries generated at step S5. On each element map, the date and entry manner of the element dictionary entry as a known element dictionary are displayed in parallel. For instance, the element map of the element dictionary number Ks=[1] corresponds to an element dictionary automatically updated on Jul. 1, 2020, and the element map of the element dictionary number Ks=[2] corresponds to an element dictionary manually updated on Jul. 8, 2020. The automatic entry means that an element dictionary is entered as an automatic entry target in accordance with a certain standard, while the manual entry means that an element dictionary is entered as a manual entry target. An element map with no description of automatic entry or manual entry attached corresponds to an element dictionary newly generated as an update element dictionary.

As it in FIG. 11, a GUI button for instructing deletion of an element dictionary (hereinafter referred to as "delete button") and a GUI button for instructing entry of an element dictionary (hereinafter referred to as "enter button") are displayed adjacent to each of the element maps of element dictionary numbers Ks=[1] to [8]. When the delete button is pressed on the input equipment 3, the corresponding element dictionary is deleted from the known element dictionary database. When the entry button is pressed on the input equipment 3, the corresponding element dictionary is entered to the known element dictionary database. For the element dictionaries of the element dictionary numbers Ks=[1] and [2] already entered, only a delete button may be displayed. Similarly, for the yet-to-be-entered element dictionaries of the element dictionary numbers Ks=[3] to [8], only an enter button may be displayed.

For the purpose of reference when selecting an entry target, an element weight map is displayed as illustrated in FIG. 11. The wafer numbers are chronologically listed. For instance, in relation to the element dictionary of the number Ks=[1], older samples have a relatively high element weight value, while more recent samples have no element weight value. This means that a defect pattern corresponding to this element dictionary does not recently appear, and therefore the operator may consider deleting this element dictionary. In relation to the element dictionary of the number Ks=[6], older samples do not have a high element weight value, while more recent samples have a relatively high element weight value. This means that the defect pattern corresponding to this element dictionary is recently observed at frequent intervals. The operator therefore may consider entering this element dictionary.

Next, automatic entry will be described. For instance, the storage control unit 15 may select an entry target element dictionary based on the value of the element weight. The standards for selecting an entry target are expressed below in Expression (7). In particular, the storage control unit 15 calculates the sum ΣH of the element weight values for each element dictionary, and selects the element dictionary as an entry target if the sum ΣH is larger than the product of the sample number N and the threshold value th_H, as expressed in Expression (7). The threshold value th_H may be set to any value such as 0.5, which means that an element dictionary will be selected as an entry target when the average value of the element weights for all the samples is 0.5 or larger.

$$\sum_n H_{k,n} > N * th_H \qquad (7)$$

Other examples for the automatic entry include the storage control unit 15 selecting an entry target element dictionary based on the value of the element dictionary. The standards for selecting an entry target are expressed below in Expression (8). In particular, the storage control unit 15 calculates the sum ΣB of values for each element dictionary B, and selects this element dictionary as an entry target if the sum ΣB is larger than the product of the number of dimensions (number of chips) D and the threshold value th_B, as expressed in Expression (8). The threshold value th_B may be set to any value such as 10, which means that an element dictionary will be selected as an entry target when the average number of defects in all the chips is 10 or larger.

$$\sum_{d} B_{d,k} > D * th_B \qquad (8)$$

The standards for selecting an entry target through automatic entry can be freely determined by the operator by way of the input equipment 3.

After step S7, the data analyzing process of the processing circuit 1 is terminated. Thereafter, the data analysis unit 14 analyzes the analysis data based on the analysis data, K element dictionaries, and K element weights. The data analysis unit 14 analyzes patterns of defective chips that appear on N semiconductor wafers in accordance with the element dictionaries, and the appearance frequency of the patterns of the defective chips in each of the N semiconductor wafers in accordance with the element weights. For instance, information relating to defect causing devices has been associated with the fixed element dictionaries of the K element dictionaries, based on which the operator may investigate the defect causing devices. For the update element dictionaries, defect causing devices are yet to be identified. Thus, the operator may identify a defect causing device through various means, and the data analysis unit 14 associates the information relating to the identified device with the element dictionary. The data analysis unit 14 may also search for a known element dictionary database using the update element dictionary as a search key, and extract an element dictionary analogous to the update element dictionary (hereinafter referred to as an "analogous element dictionary"). The element map and element weight map of the analogous element dictionary may be displayed by the display control unit 16 on the display equipment 5. At the time of this display, the defect causing device associated with the analogous element dictionary may also be displayed on the display equipment 5.

The above flow of the data analyzing process is presented merely as an example and is not a limitation. The order of step S6 and step S7 may be reversed. Furthermore, the matrix factorization is explained as non-negative matrix factorization in the above processing, but the present embodiment is not limited thereto. For example, methods such as principal component analysis, singular value decomposition, linear discriminant analysis, and independent component analysis may be adopted, or a neural network with parameters trained to implement any of these methods may be adopted.

In the data analyzing process, K initial element dictionaries that include M fixed element dictionaries are generated at step S3. That is, M is freely set as long as it is smaller than K. However, K may be determined in accordance with M. In particular, the number K of initial element dictionaries may be set to a number of the set number M to which a certain number is added. If new element dictionaries are regularly generated, a certain number M may be assigned to newly generated element dictionaries so as to analyze the known element dictionaries and new element dictionaries.

According to the above explanation, the data analyzing apparatus 100 includes at least a processing circuit 1. The processing circuit 1 includes at least a data acquisition unit 11 and a data factorization unit 12. The data acquisition unit 11 acquires analysis data containing the number N of analysis target samples. The data factorization unit 12 performs a matrix factorization on the analysis data to factorize the analysis data into K element dictionaries (basis samples) and K element weights. Here, the data factorization unit 12 fixes part of the K element dictionaries to specific element dictionaries in the matrix factorization.

With the above configuration, new element dictionaries and element weights can be generated in a manner similar to the conventional method, and at the same time, the element weight of the known element dictionary can be calculated. As a result, even when multiple sets of analysis data are to be analyzed in the long term, new element dictionaries can be generated while monitoring the generation of the known element dictionaries. In this manner, the known element dictionaries can be analyzed in the long term, and unknown element dictionaries can be simultaneously discovered.

The operation examples of the data analyzing process according to the present embodiment will be explained below.

FIG. 12 is a diagram for explaining the first operation example of the data analyzing process according to the present embodiment. In the first operation example, an element dictionary entered based on the element weight values is used as a fixed element dictionary. As illustrated in FIG. 12, NMF is performed upon the analysis data of Jul. 1, 2020, as a result of which eight element dictionaries and eight element weights are generated. The sum ΣH of element weights of the element dictionary of the number Ks=[8] is larger than the product of the sample number N and the threshold value th_H as in Expression (7), and this element dictionary is therefore automatically entered as an entry target.

Furthermore, in the inspection of Aug. 1, 2020, the element dictionary of the number Ks=[8] is used as a fixed element dictionary, as in FIG. 12. The element dictionaries of other numbers Ks=[1] to [7] are used as update element dictionaries. NMF is performed upon the analysis data of Aug. 1, 2020, as a result of which eight element dictionaries and eight element weights are generated. If the element weight has been reduced for the element dictionary of the number Ks=[8], the processing circuit 1 may obtain the element weight of the lowly-weighed element dictionary and display this element weight, unlike the case of all element dictionaries being update element dictionaries. In this manner, the operator can ascertain the element weight of the lowly-weighed element dictionary. Thus, according to the present embodiment, the element weight of the element dictionary of interest can be ascertained in the long term, regardless of its element weight.

In the second operation example, a fixed element dictionary is generated based on multiple defect maps. For instance, the average value of the element dictionaries with a high defect ratio (sample value) among the defect maps may be adopted as a fixed element dictionary. This defect map is a map on which approximately the same sample value is distributed across all the chips. The defect map used for the generation of a fixed element dictionary may be selected by the operator by way of the input equipment 3; alternatively, an element dictionary having a sum of the defect ratios larger than the threshold value may be automatically selected. By generating a fixed element dictionary based on the defect maps, a statistically important element dictionary can be automatically generated.

According to the above embodiment, the processing circuit 1, storage device 2, input equipment 3, communication equipment 4, and display equipment 5 are arranged in the data analyzing apparatus 100 that is a single computer. The processing circuit 1, storage device 2, input equipment 3, communication equipment 4, and display equipment 5, however, may be separated and distributed to multiple computers. For instance, the processing circuit 1 and the storage device 2 may be separately arranged on multiple computers communicably coupled to each other via a network. In this manner, a computer that stores the known element dictionaries and a computer that performs the data factorization by the data factorization unit 12 can be separately provided. Furthermore, the data acquisition unit 11, data factorization unit 12, initial element dictionary determination unit 13, data analysis unit 14, storage control unit 15, and display control unit 16 need not be implemented in a single computer, but may be separately implemented in multiple computers that are communicably coupled to each other by way of a network.

According to the present embodiment, the analysis data is semiconductor inspection data. The present embodiment is not limited thereto. For instance, the analysis data may be any data that can be represented in matrix expression such as purchase history data, voice data, and viewer log data. The purchase history data represents product purchase histories of a person for a unit period of time. By factorizing the purchase histories of a large number of clients into element dictionaries and element weights, products simultaneously purchased can be analyzed with reference to the element dictionaries. In addition, the element dictionary with a pattern similar to the purchase pattern of each client can be analyzed with reference to the element weights. The voice data represents data such as a voice spectrum collected by a sound collecting device such as a microphone. By factorizing the sound sources of multiple speakers making utterances into element dictionaries and element weights, the features of each speaker's voice can be analyzed with reference to the element dictionaries, and the utterance timing of each speaker can be analyzed with reference to the element weights. The viewer log data represents histories of viewing and listening to contents including TV programs, radio programs, video contents of video streaming services, video contents of video hosting services, and music contents of music streaming services. By factorizing the viewer log data of viewers into element dictionaries and element weights, the viewing pattern can be analyzed with reference to the element dictionaries, and the viewing pattern in the element dictionaries similar to each viewer's pattern of viewing the contents can be analyzed with reference to the element weights.

In light of the above, according to the present embodiment, a data analyzing apparatus, method, and program that can acquire weights for both a known element dictionary (basis sample) and an unknown element dictionary (basis sample) can be offered.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data analyzing apparatus comprising:

communication equipment configured to acquire data including a number N of samples from a computer in a semiconductor factory, where N is an integer larger than or equal to 2; and a processing circuit configured to:

acquire, from the communication equipment, the data containing the number N of samples, as analysis targets; and perform a matrix factorization upon the data and factorize the data into a number K of basis samples and the number K of weights corresponding to the number K of basis samples, where K is an integer larger than or equal to 2, wherein a portion of the number K of basis samples is fixed to specific basis samples in the matrix factorization, wherein each of the number N of samples comprise semiconductor inspection data items indicative of information relating to the number of defects or flaws in chips arranged on a semiconductor wafer, and wherein the processing circuit is further configured to analyze an appearance frequency of occurrence patterns of defective chips that appear on N semiconductor wafers or the occurrence patterns of the defective chips in each of the N semiconductor wafers based on the number K of basis samples and the number K of weights.

2. The data analyzing apparatus according to claim 1, wherein:

the processing circuit determines a number M of first initial basis samples, where M is an integer larger than or equal to 1, to be fixed as the specific basis samples in the matrix factorization, and a number K-M of second initial basis samples to be updated in the matrix factorization, and the processing circuit updates the number K-M of second initial basis samples and the number K of weights until a stop condition is satisfied, while fixing the number M of first initial basis samples as the specific basis samples in the matrix factorization, to factorize the data into the number K of basis samples and the number K of weights.

3. The data analyzing apparatus according to claim 2, wherein the processing circuit performs the matrix factorization that includes an update algorithm that is iterated until a loss function satisfies the stop condition, to factorize the data into the number K of basis samples and the number K of weights, the loss function evaluating an error between the data and a product of the basis samples and the weights.

4. The data analyzing apparatus according to claim 2, the apparatus further comprising:

a storage device configured to store known basis samples that are previously generated, wherein the processing circuit selects the known basis samples as the specific basis samples, or generates the specific basis samples based on the known basis samples.

5. The data analyzing apparatus according to claim 1, the apparatus further comprising:

a storage device configured to select a storage target basis sample and/or weight from the number K of basis samples and/or the number K of weights in accordance with a command from an operator, and store the storage target basis sample and/or weight.

6. The data analyzing apparatus according to claim 5, wherein the processing circuit displays a GUI screen for selecting the storage target basis sample from the number K of basis samples on a display device.

7. The data analyzing apparatus according to claim 1, the apparatus further comprising:

a storage device configured to select a storage target basis sample from the number K of basis samples in accordance with the weights and/or a sample value, and store the storage target basis sample.

8. The data analyzing apparatus according to claim 2, wherein the processing circuit determines the number K in accordance with the number M.

9. The data analyzing apparatus according to claim 1, wherein the number N of samples, the number K of representative maps, and the number K of weights take non-negative values.

10. The data analyzing apparatus according to claim 1, wherein the processing circuit displays the number K of basis samples and/or the number K of weights on a display device.

11. The data analyzing apparatus according to claim 10, wherein the processing circuit displays the number K of heat maps corresponding to the number K of basis samples.

12. The data analyzing apparatus according to claim 10, wherein the processing circuit displays a weight map that expresses the number K of weights in colors or shapes on a two-dimensional plane having a first axis indicative of identifiers of the number N of samples and a second axis indicative of identifiers of the number K of basis samples.

13. A data analysis method executed by a data analyzing apparatus comprising communication equipment and a processing circuit, the method comprising:

controlling the communication equipment to acquire data including a number N of samples from a computer in a semiconductor factory, where N is an integer larger than or equal to 2;

acquiring, from the communication equipment, the data containing the number N of samples, as analysis targets; and performing a matrix factorization on the data and factorizing the data into a number K of basis samples and the number K of weights corresponding to the number K of basis samples, where K is an integer larger than or equal to 2, and fixing part of the number K of basis samples to specific basis samples in the matrix factorization, wherein each of the number N of samples comprise semiconductor inspection data items indicative of information relating to the number of defects or flaws in chips arranged on a semiconductor wafer, and wherein the method further comprises analyzing an appearance frequency of occurrence patterns of defective chips that appear on N semiconductor wafers or the occurrence patterns of the defective chips in each of the N semiconductor wafers based on the number K of basis samples and the number K of weights.

14. A non-transitory computer readable medium including computer executable instructions, wherein the instructions, when executed by a processor, cause the processor to perform operations comprising:

controlling communication equipment to acquire data including a number N of samples from a computer in a semiconductor factory, where N is an integer larger than or equal to 2;

acquiring, from the communication equipment, the data containing the number N of samples, as analysis targets; and performing a matrix factorization on the data and factorizing the data into a number K of basis samples and the number K of weights corresponding to the number K of basis samples, where K is an integer larger than or equal to 2, and fixing a portion of the number K of basis samples to specific basis samples in the matrix factorization, wherein each of the number N of samples comprise semiconductor inspection data items indicative of information relating to the number of defects or flaws in chips arranged on a semiconductor wafer, and wherein the operations further comprise analyzing an appearance frequency of occurrence patterns of defective chips that appear on N semiconductor wafers or the occurrence patterns of the defective chips in each of the N semiconductor wafers based on the number K of basis samples and the number K of weights.

* * * * *